US012808482B2

(12) United States Patent
Karabailu Nagalakkana Gowda et al.

(10) Patent No.: US 12,808,482 B2
(45) Date of Patent: Nov. 24, 2026

(54) COMPOSITE THREADED STANDOFF UNIT

(71) Applicants: TE Connectivity India Private Limited, Bangalore (IN); Deutsch India Power Connectors Private Limited, Bangalore (IN)

(72) Inventors: Manjesh Gowda Karabailu Nagalakkana Gowda, Bangalore (IN); Rejish Ambat, Bangalore (IN); Niranjan Hegde Kundapura, Bangalore (IN); Samee Mohammed Abdul Ghani, Bangalore (IN)

(73) Assignees: TE Connectivity India Private Limited, Bangalore (IN); Deutsch India Power Connectors Private Limited, Bangalore (IN)

( * ) Notice: Subject to any disclaimer, the term of this patent is extended or adjusted under 35 U.S.C. 154(b) by 0 days.

(21) Appl. No.: 18/660,362

(22) Filed: May 10, 2024

(65) Prior Publication Data

US 2024/0384834 A1 Nov. 21, 2024

(30) Foreign Application Priority Data

May 16, 2023 (IN) ............................. 202341034356

(51) Int. Cl.
*F16M 13/02* (2006.01)

(52) U.S. Cl.
CPC .................................. *F16M 13/02* (2013.01)

(58) Field of Classification Search
CPC ................................ G09F 17/00; F16M 13/02
USPC ......................... 248/511, 519, 523, 527, 539
See application file for complete search history.

(56) References Cited

U.S. PATENT DOCUMENTS 5,354,031 A * 10/1994 Bilotti ................ E04H 12/2238 248/910
6,113,054 A * 9/2000 Ma ...................... E04H 12/2238 248/910
6,869,058 B2 * 3/2005 Tung .................. E04H 12/2238 248/910
2002/0141187 A1 * 10/2002 Lin ...................... A47G 33/126 362/284
2022/0099247 A1 * 3/2022 Builder .................. A45B 11/00
2025/0135305 A1 * 5/2025 Perez Quinonero ......................... A63B 57/357

* cited by examiner

*Primary Examiner* — Alfred J Wujciak
(74) *Attorney, Agent, or Firm* — Jay J. Hoette; Carroll, Hoette & Butscher, LLC

(57) ABSTRACT

A composite standoff unit for attaching on a mounting surface includes a bottom platform, a standoff column, and threaded portion formed within the standoff column. The bottom platform includes a bonding surface configured to be attached with the mounting surface. The bonding surface includes a plurality of nubs of predefined dimension disposed in a spaced apart manner. The nubs define a bond-line thickness between the bonding surface and the mounting surface. The standoff column extends vertically from bottom platform. The standoff column is formed with an inner cavity that has a proximal end and a distal end. The proximal end is formed adjacent to the bottom platform, and the threaded portion is disposed adjacent to the distal end on the inner cavity.

12 Claims, 1 Drawing Sheet

COMPOSITE THREADED STANDOFF UNIT

CROSS REFERENCE TO RELATED APPLICATIONS

This application claims the benefit of IN Application No. 202341034356, filed 16 May 2023, the subject matter of which is herein incorporated by reference in its entirety.

BACKGROUND OF THE INVENTION

The subject matter herein in general relates to a supporting mechanism and structure thereof which is attached to a mounting surface to bear hardware components such as cables, conduits, etc. with the help of adjustable clamps or clips. More particularly, the subject matter relates to a composite threaded standoff unit having adhesive based bonding surfaces, and its improvement regarding securing them to the mounting surface.

Standoff units are commonly used to support cables and conduits in various indoor and outdoor applications. These standoff units are typically made of materials such as metals and plastic and come in a range of sizes and configuration to accommodate different cable and conduit size. Standoff units are well known for their use in a variety of sector such as aerospace, industrial and automotive applications for supporting such cables and conduits relating to electrical, pneumatic and/or hydraulic service lines. A typical standoff unit comprises a base portion adapted for a secure mounting onto the mounting surface.

The base portion comes in combination with an elongated standoff column projecting outwardly a short distance from the base structure. In the conventional standoff units, the standoff column having the base portion is moulded as a single component. Next a separately moulded component having a threaded portion such as nut is inserted into the cavity of the standoff column. Further, an elongated plug can be further inserted within said standoff column and thereby further interacting with the threaded nut and retaining it. The threaded nut portion is adapted for thread-in engagement with a mating fastener such as a suitable bolt or screw used for mounting and the above discussed, such as an electrical wiring bundle or the like, generally at a distal or free end of the standoff unit. Thus, disadvantageously, the increased number of components leads to complex working technique of said standoff unit with increased carbon footprint. Further, this moulding and assembling processes induces additional assembly time and failures due to improper assembling.

Now, in case of application of the standoff units in body panels of certain ground vehicles, aircrafts, space-bound vehicles used in aerospace etc., where the structural integrity is of a prominent importance, the base portion of the standoff attachment is adapted for adhesive bonded mounting. This mounting method using adhesives to a bonding surface of the base portion simply avoids that need to form one or more holes in the substrate to put-in engagement screws.

In many applications, a bunch of conduits having a substantial weight need to be supported using these standoff units. Accordingly, to provide a sturdy fixation of the standoff units with the mounting surface, it is often considered to use a reliable adhesive, such as acrylic-based adhesive, rubber-based adhesive, epoxy adhesives, silicon adhesives etc. It is known in the art to put these types of adhesives on the bonding surface and thereupon place on the mounting surface without an applicator. The applicator generally is used to apply pressure to the standoff units against the mounting surface, giving the adhesive enough time for curing, ensuring a proper seating of the standoff units.

Conventionally, the adhesives, in gel or other semi-liquid formed are poured to the bonding surface and stuck on the mounting surface without considering the amount of adhesive and the weight increment because of the excess adhesive. However, in case of aircraft and space-bound vehicles, weight of the machines and components installed therein is of great concern, more so, because of the huge number of cable harness mounting brackets are used. Additional weight of said excess adhesive thus affects in a cumulative manner.

A known way of addressing such problem is to use a specific type of adhesive having glass beads. Due to the added glass beads as reinforcing agent, the adhesive property is increased which is one of the reasons of their application in automotive, aerospace and construction industries. These glass beads are generally spherical in shape, having a predetermined diameter. Thus, these type of adhesives provide some dimensional standard regarding thickness of the adhesive used on the bonding surface. However, disadvantageously, one has to always depend on the standard set by the adhesive manufactures in addition to the possibility of uneven diameter of glass beads.

Furthermore, presently, remarkable improvements on numerous properties of adhesives are being carried out to drastically reduce the curing time thereof. Thus, it is often required or desired to use adhesive without glass beads to minimize the curing time while maintaining optimal thickness of the adhesive layer (bond-line thickness). Thus, it is required to have predefined optimum bond-line thickness while installing the standoff units, regardless of the type of adhesive used. However, there exists no known feature of the standoff units dedicated to meet the requirements as discussed.

With a view therefore to overcome the technical problems associated with conventional standoff units and its mounting method and means, the inventors felt the need to develop a novel standoff unit working towards achieving an optimum bond-line thickness with adhesive even without glass beads, at the same time reducing number of moulded components and reducing the weight thereof without compromising the structural integrity.

BRIEF DESCRIPTION OF THE INVENTION

Embodiments herein provide a standoff unit where an optimum bond-line thickness of adhesive is achieved when installing a standoff units without depending on the choice of adhesive.

Embodiments herein reduce the number of components in the standoff unit by providing a composite molded threaded portion within said standoff unit.

With the choice of adhesive having minimal curing time, embodiments herein install a standoff unit without using applicator and thus reducing carbon foot-print and saving production cost at the same time.

Embodiments herein reduce the material weight from a construction perspective of the invented individual standoff unit leading to a cumulative weight reduction when a huge number of cable harness mounting brackets are put into action.

Embodiments herein provide a composite standoff unit for attaching on a mounting surface. The composite standoff unit comprises a bottom platform, a standoff column, and threaded portion formed within said standoff column. The bottom platform comprises a bonding surface configured to be attached with said mounting surface. The bonding surface comprises plurality of nubs of predefined dimension disposed in a spaced apart manner. The nubs define a bond-line thickness between said bonding surface and said mounting surface. The standoff column extends vertically from bottom platform. The standoff column is formed with an inner cavity that has a proximal end and a distal end. The proximal end is formed adjacent to said bottom platform, and the threaded portion disposed adjacent to said distal end on said inner cavity.

According to an aspect, said plurality of nubs of predefined dimension are placed in a symmetrical manner on the said bonding surface.

According to another aspect, said standoff column comprises an outer surface having plurality of longitudinally extending slotted channels defining a non-circular outer periphery of said standoff column.

According to yet another aspect, said threaded portion is molded together with said inner cavity of said standoff column as a single piece.

BRIEF DESCRIPTION OF THE DRAWINGS

For better understanding, an illustrative embodiment of the invention will now be described with reference to the accompanying drawings. It will however be appreciated that the embodiment exemplified in the drawings is merely illustrative and not limitative to the scope of the invention, because it is quite possible, indeed often desirable, to introduce a number of variations in the embodiment that have been shown in the drawings. In the accompanying drawings.

DETAILED DESCRIPTION OF THE INVENTION

In the following, numerous specific details are set forth to provide a thorough description of exemplary embodiments. Those skilled in the art will recognize and appreciate that, despite of the detailed nature of the exemplary embodiment provided here; changes and modifications may be applied to said embodiments without limiting or departing from the generally intended scope. Like numbers refer to like elements throughout.

Figure 1:
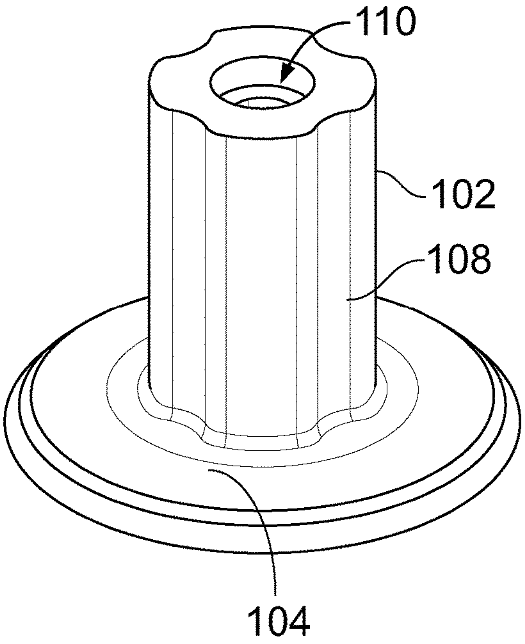
FIG. 1 depicts a top perspective view of a composite threaded standoff unit according to an exemplary embodiment.

FIG. 1 of the accompanying drawings depicts a perspective view of a standoff unit (100) showing the structural feature thereof. The standoff unit (100) has a bonding surface (106) which is to be attached with a mounting surface using a bonding agent such as adhesive and thereby supporting conduits, cables, etc. With reference to figures, the standoff unit (100) comprises a bottom platform (104), a standoff column (102), and threaded portion (116) formed within said standoff column (102).

According to a suitable application of the standoff unit (100), various supporting structures such as screwable clamps are attached with a distal end (114) of said standoff column (102). For the sake of brevity, the description of engagement of clamps with the standoff column (102), and thereupon insertion of one or more wiring cables and conduits within said clamp is not provided herein. More specifically, the clamps are screwed with said threaded portion (116). Depending on the type of application, various types of clamps can be used at least having a screwing portion that gets attached with said threaded portion (116).

Figure 2:
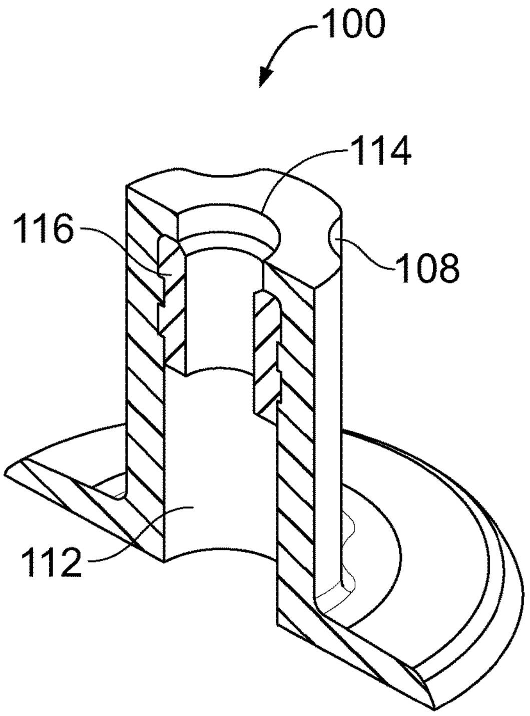
FIG. 2 is cut-away sectional view of the threaded standoff unit illustrating the threaded portion molded at its inner cavity, according to an exemplary embodiment.

As shown in the cross-sectional view of FIG. 2, the threaded portion (116) is internally molded with the standoff column (102), more specifically, to an inner cavity (110) of the standoff column (102). This composite molding eliminates the need for additional nut or threading means to be inserted within the standoff column (102). The standoff column (102), according the preferred embodiment is extending from the bottom platform (104), in a vertical direction. The proximal end (112) of the standoff column (102) is formed as continuous part with the bottom platform (104).

The outer surface of the standoff column (102) comprises a plurality of longitudinally extending slotted channels (108). The channels result in reduction of molding material and reduction of overall weight of said standoff unit (100). The slotted channels (108), are preferably disposed in a symmetrical spaced apart manner, defining a non-circular outer periphery of said standoff column (102). The inner cavity (110) of the standoff column (102) has a smooth cylindrical profile having said threaded portion (116) formed adjacent to the distal end (114) of the standoff column (102).

Figure 3:
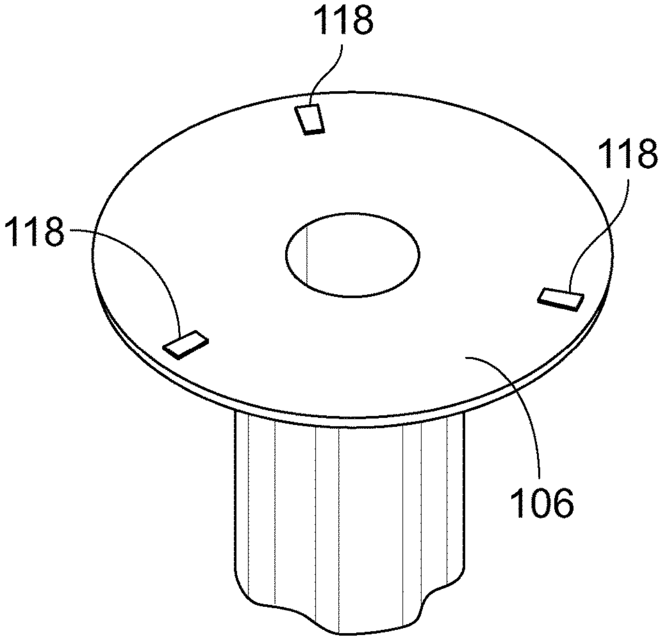
FIG. 3 depicts a perspective view of the threaded standoff unit turned upside down showing its bonding surface, according to an exemplary embodiment.

With reference to FIG. 3 of the accompanying drawings, the bottom platform (104) comprises a bonding surface (106) provided with plurality of nubs (118) that are disposed in a spaced apart manner. In the present embodiment, three nubs (118) are provided on the bonding surface (106) of said bottom platform (104) in a symmetrical manner. The shape of said nubs (118), according to one embodiment is hemispherical. A person skilled in the art would appreciate the fact that the functionality of said buds are not limitative to their shape, number, placement or dimension. The dimension or extension of these nubs (118) are selected based on the requirement of the installation site depending upon the requirement of thickness of adhesive.

In order to attach said standoff unit (100) to a mounting surface, first an adhesive is put on the bonding surface (106). Then the standoff unit (100) is pressed against the mounting surface until an optimum bond-line thickness or gap is created between the mounting surface and the bonding surface (106) having the adhesive in between. The gap is defined by the dimension of said buds, which in turns also defines the optimum thickness of adhesive layer between the mounting surface and said bonding surface (106). For the purpose of attaching said standoff unit (100) with glass bead type adhesive, the dimension of said buds can also the chosen in-line with the dimension of the glass beads.

As already mentioned, the foregoing description is illustrative of the invention and not limitative to its scope, because it will be apparent to persons skilled in the art to devise other alternative embodiments without departing from the broad ambit of the disclosures made herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A composite standoff unit for attaching on a mounting surface, wherein said composite standoff unit comprises:

a bottom platform comprising a bonding surface configured to be attached with said mounting surface by a bonding agent, said bonding surface comprises a plurality of nubs of predefined dimension disposed in a spaced apart manner whereby said nubs define a bond-line thickness between said bonding surface and said mounting surface for the bonding agent; and a standoff column extending vertically from bottom platform, said standoff column is formed with an inner cavity having:

a proximal end formed adjacent to said bottom platform, wherein the proximal end is formed as a continuous part with the bottom platform, a distal end, and a threaded portion disposed adjacent to said distal end on said inner cavity.

2. The composite standoff unit as claimed in claim 1, wherein said plurality of nubs of predefined dimension are placed in a symmetrical manner on the said bonding surface.

3. The composite standoff unit as claimed in claim 2, wherein said standoff column comprises an outer surface having a plurality of longitudinally extending slotted channels defining a non-circular outer periphery of said standoff column.

4. The composite standoff unit as claimed in claim 2, wherein said threaded portion is molded together with said inner cavity of said standoff column as a single piece.

5. The composite standoff unit as claimed in claim 1, wherein said standoff column comprises an outer surface having a plurality of longitudinally extending slotted channels defining a non-circular outer periphery of said standoff column.

6. The composite standoff unit as claimed in claim 5, wherein said threaded portion is molded together with said inner cavity of said standoff column as a single piece.

7. The composite standoff unit as claimed in claim 1, wherein said threaded portion is molded together with said inner cavity of said standoff column as a single piece.

8. The composite standoff unit as claimed in claim 1, further comprising a bonding agent applied to the bonding surface of the bottom platform.

9. The composite standoff unit as claimed in claim 8, wherein the bonding agent is an adhesive.

10. The composite standoff unit as claimed in claim 8, wherein the bonding agent is configured to permanently attach the bottom platform to the mounting surface.

11. The composite standoff unit as claimed in claim 1, wherein the nubs have distal ends, the distal ends of the nubs being flat and coplanar with each other, the distal ends of the nubs being parallel to the bonding surface.

12. The composite standoff unit as claimed in claim 1, wherein the nubs are integral with the bottom platform as a unitary molded structure.

* * * * *